United States Patent Office 3,564,072
Patented Feb. 16, 1971

3,564,072
ETHYLENE DIMERIZATION
Walter A. Butte, Jr., West Chester, Pa., assignor to Sun Oil Company, Philadelphia, Pa., a corporation of New Jersey
No Drawing. Filed May 6, 1969, Ser. No. 822,312
Int. Cl. C07c 3/18
U.S. Cl. 260—683.15      5 Claims

ABSTRACT OF THE DISCLOSURE

Ethylene is dimerized by contact at a temperature in the range of −40° to 100° C., preferably −10° to 50° C., with novel catalyst systems formed by combining (1) certain types of nickel (II) phosphine coordination complexes; (2) inorganic Lewis acids such as $AlCl_3$, $BF_3$, $AlBr_3$, etc.; and (3) an excess of a phosphine. The proportions of the catalyst components are such that the atomic ratio of Al:Ni is in excess of 2:1, the molar ratio of Lewis acid:phosphine is in the range of 2.5:1 to 3.5:1, and the catalysts are used in solution in a suitable liquid medium, e.g., chlorobenzene.

---

This invention relates to novel catalyst compositions and to their use in the dimerization of ethylene.

The catalysts of the invention are combinations of coordination complexes of nickel (II) phosphines, inorganic Lewis acids, as hereinafter specified, and an excess of a phosphine such that the molar ratio of Lewis acid:phosphine is in the range of 2.5:1 to 3.5:1. The catalysts have particular utility in the dimerization of ethylene into butenes, and particularly butene-1. These catalysts are normally used in solution in a non-polar solvent so that the catalyst system is homogenous, and they are effective at room temperature or at temperatures considerably below and above room temperature, e.g., from −40° to 100° C.

In the prior art it has been disclosed (Dutch Pat. 6,409,179, filed Aug. 10, 1964; Wilke, Angew. Chem., vol. 78, No. 3, 1966, pp. 170–171) that catalysts capable of dimerizing propylene can be made utilizing π-allyl metal halides complexed with a phosphine such as triphenylphosphine or tricyclohexylphosphine. These π-allyl metal halide phosphine complexes can, for example, be represented by the following formula:

wherein Me is nickel (II) or cobalt (II) and X is chlorine, bromine, or iodine. The use of these complexes in combination with a Lewis acid, such as ethyl aluminum dichloride or aluminum bromide, to catalyze the dimerization of propylene at low temperatures is disclosed. It was shown that such catalysts are selective in the manner in which they cause dimerization to occur and that the structure of the dimer product will depend largely on the particular R group in the phosphine component of the catalyst.

By way of example of such prior art, when the π-allyl complex was made by combining π-allyl nickel iodide with triphenylphosphine and the resulting complex was used in combination with ethyl aluminum dichloride, dimerization occurred mainly in the following manner:

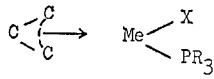

Thus 2-methylpentene mainly results when the phosphine contains R groups such as phenyl which impart to the phosphine component a relatively electron-accepting character.

On the other hand, when π-allyl nickel iodide was combined with tricyclohexylphosphine and the resulting complex was used together with ethyl aluminum dichloride, the dimerization proceeded mainly as follows:

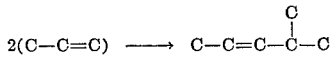

Thus, 2,3-dimethylbutene is the main product when the phosphine component contains R groups such as cyclohexyl that give the phosphine an electron-donating character.

The foregoing prior art catalysts made from π-allyl metal cordination compounds have several drawbacks which detract from their usefulness in practical applications. In the first place, the π-allyl metal complexes are difficult to prepare. Complexes of this kind are highly reactive with air and moisture, and they are unstable to light. Furthermore, the activity of the catalyst made by combining these complexes with a Lewis acid tends to decline rapidly even when these catalysts are used at room temperature; and hence it is necessary to use sub-zero temperatures, such as −10° to −80° C., when they are employed for dimerizing olefins.

It has further been disclosed (Ewers, Angew. Chem., vol. 78, 1966, page 593) that catalysts which are probably π-complexes of Ni(O), formed when a nickel salt (e.g., bisacetylacetonatonickel) is reduced with an organoaluminum chloride in the presence of a phosphine, are useful in the dimerization of ethylene and propylene.

In a copending application herewith, Ser. No. 675,280 filed Oct. 16, 1967, now U.S. Pat. No. 3,482,001, by Gert G. Eberhardt which is a continuation-in-part of Ser. No. 551,953, filed May 23, 1966, now abandoned, it was disclosed that dimerization of olefins is carried out in the presence of a catalyst which is a combination of a nickel (II) or cobalt (II) halide phosphine coordination complex and an organoaluminum halide, wherein the Al:Ni or Al:Co atomic ratio is greater than 2:1. Note that inorganic Lewis acids such as $AlCl_3$ are not operable in the previously disclosed invention.

The present invention provides an improved catalyst system which avoids some disadvantages of the prior art catalysts. The present catalysts are more easily prepared and are made from metal complexes which are considerably more stable with respect to air, moisture, light, and elevated temperatures than the π-allyl metal complexes; and the instant catalysts employ inorganic Lewis acids, thus creating obvious economic advantages. Further, the system produces a high selectivity for butene-1 which is not present with other heretofore disclosed catalyst systems. In using the present catalysts low temperatures are not required in order to avoid rapid catalyst deactivation, and the dimerization reaction can readily be carried out at room temperature at high rates to obtain high yields of product per unit weight of catalyst.

The catalyst systems provided by the present invention are a combination of a different type of metal phosphine coordination complex, certain specific kinds of Lewis acids, and an excess of phosphine. The metal of the coordination complex is nickel (II), and the complex can correspond to any of the following formulas:

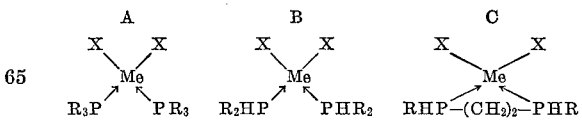

wherein Me is nickel (II) and wherein X can be either chlorine, bromine, or iodine. It should be noted that Me includes only nickel (II) since other metals (e.g., cobalt, iron, platinum, palladium), while being capable of forming analogous coordination complexes, do not give useful catalysts for the present purpose. R in all of these formulas represents any hydrocarbyl radical having 1 to 30 carbon atoms selected from the group consisting of alkyl, cycloalkyl, alkenyl, cycloalkenyl, aryl, aralkyl, and aralkenyl. While the R groups can have an influence on the structure of the dimer product depending upon the type of R group present in the coordination complex and also can have an influence with respect to degree of solubility of the resulting catalyst, any R group(s) as above specified is (are) operative for preparing catalyst systems in accordance with the invention. The R groups in the coordination complex employed can be the same or different hydrocarbyl radicals. Of the three types of coordination complexes shown, Type A generally is preferred.

The Lewis acids, with which the foregoing coordination complexes are combined to give the present catalyst systems, are all inorganic compounds. Examples of such acids are $AlCl_3$, $AlBr_3$, $BF_3$, $SbF_5$, and $BCl_3$. Also combined with the foregoing Lewis acid and coordination complex is an excess of the phosphine compound employed to form the coordination complex, or a second phosphine compound; said second phosphine compound having the same limitations on the hydrocarbyl radicals as aforedescribed. The only requirement of the excess or second phosphine compound is that it be present in sufficient quantities such that the molar ratio of Lewis acid to phosphine be in the range of 2.5:1 to 3.5:1, with the preferred ratio being 3:1. Generally, an excess of phosphine is merely added. As will be hereinafter described, the molar ratio of Lewis acid to phosphine is a critical limitation for the successful use of the instant catalyst system.

The dimerization reaction can be carried out by contacting ethylene with a solution of the catalyst at a temperature in the range of $-40°$ to $100°$ C., and more preferably $-10°$ to $50°$ C. It should be noted that for all practical purposes dimerization with higher olefins such as propylene is unreactive. The reaction is preferably carried out employing a solvent which has some degree of polarity, although it can also be effected in many cases without such solvent by utilizing excess olefin charge material as solvent. Suitable solvents are described in more detail hereinafter. When a solvent is not employed and an excess of olefin is used instead as solvent, the R groups in the phosphine component of the catalyst should contain sufficient carbon atoms to impart to the metal coordination compound substantial solubility in the olefin employed.

As previously indicated, a solvent preferably is employed in carrying out the present process. The solvent must be capable of dissolving the catalyst and must be liquid at the temperature and pressure conditions employed. Solvents which have high dipole moments, such as water, alcohols, ketones, esters, amines, dioxane, and tetrahydrofuran, will irreversibly coordinate with the nickel and deactivate the catalyst. The best solvents are aromatic hydrocarbons, and halogenated aliphatic and aromatic compounds in which the halogen is chlorine, bromine, fluorine, or combinations of such substituents. These have good solvency for the catalyst components. The preferred solvents are the aromatic hydrocarbons such as benzene, toluene, etc.

Halohydrocarbons that are particularly suitable as the solvent medium are halobenzenes having 1 to 2 halogen atoms, trihaloethanes, tetrahaloethanes, trihaloethylenes, and tetrahaloethylenes, in which halohydrocarbons the halogen can be chlorine, bromine, or fluorine, or combinations of such substituents. Particularly suitable solvents are the monohalobenzenes, viz., chlorobenzene, bromobenzene, and fluorobenzene, and dihalobenzenes which are liquid at the reaction temperature, such as ortho- and meta-dichlorobenzenes, dibromobenzenes, or difluorobenzenes. Examples of other halohydrocarbons that can be used are methyl chloroform; methyl bromoform; 1,1,2-trichloroethane; 1,1,2,2-tetrachloroethane; trifluoroethanes; tribromoethanes; chlorodifluoroethanes; trichlorotrifluoroethanes; tetrafluoroethanes; and similar ethylene derivatives containing 2 to 4 halogen atoms which are chlorine, bromine, and/or fluorine. Many other halogenated hydrocarbon solvents can also be used.

In formulating the catalyst system preparatory to carrying out the dimerization reaction, a nickel coordination complex of types A, B, or C, as above specified is first prepared. Metal halide phosphine complexes are known and are described in "Advances in Inorganic and Radiochemistry," vol. 6, Academic Press (1964), pp. 12–21 and 27–31. They can be made by dissolving the chloride, bromide, or iodide of nickel (II) in a solvent such as alcohol and adding a stoichiometric amount of the phosphine. The coordination complex forms readily and precipitates, and it is recovered by filtering the mixture and drying the residue. For the present purpose, it is distinctly preferable to use either the chloride or bromide of nickel (II) to make the complex.

The following are some specific illustrations of coordination complexes prepared in this manner in which R is phenyl, Me is nickel, and X is chlorine:

Type A: $NiCl_2$+2(triphenylphosphine)→bis(triphenylphosphine)nickel chloride

Type B: $NiCl_2$+2(diphenylphosphine)→bis(diphenylphosphine)nickel chloride

Type C: $NiCl_2$+1,2 - bis(phenylphosphine)ethane→1,2-bis(phenylphosphine)ethane nickel chloride The bis-phosphine used in preparing the complex of Type C is a chelating phosphine, and the resulting chelate complex likewise is a known compound as can be seen from the reference referred to above.

The so prepared coordination complex is dissolved in a solvent which preferably is an aromatic hydrocarbon as described above, and the inorganic Lewis acid, which as previously stated is $AlCl_3$, $BF_3$, $AlBr_3$, etc., is added in a proportion such that in excess of two atoms of aluminum are provided per atom of nickel in the coordination complex. Preferably the proportion of Lewis acid to the complex is well in excess of this proportion. While it is not known with certainty, it is believed that the resulting catalyst is a species formed by the combination of one mole of the coordination complex with at least two moles of the Lewis acid (i.e., the equivilent of at least two aluminum atoms per atom of nickel). The use of the Lewis acid in less than this 2:1 molar ratio is substantially inoperative. It is distinctly preferable to employ a large excess of the Lewis acid such that the atomic ratio of Al:Me is in the range of 10:1 to 100:1, and the most desirable ratio generally is of the order of 20 to 30:1. A large excess of the Lewis acid is particularly important when an iodide of nickel has been used to prepare the coordination complex (i.e., where X is iodine), as development of the active catalyst depends upon chlorine or bromine being interchanged with iodine upon addition of the Lewis acid. A large excess of the Lewis acid aids this interchange.

Also added to the catalyst system is an excess quantity of a phosphine such that the molar ratio of the Lewis acid to the added phosphine is in the range of 2.5:1 to 3.5:1, and preferably 3:1. The molar ratio is essential to the successful operation of the instant invention, since it has been found that catalysts formed with ratios outside the desired range have exhibited low catalytic activity thus producing low product yields. When forming the catalyst system, the desired phosphine excess can be introduced by adding an excess over the stoichiometric amount when forming the coordination complex as when the identical phosphine is employed, or the excess phosphine can be introduced following the formation of the coordination complex or after the Lewis acid has been introduced to the system.

When a highly polar material, e.g., water, is mixed with the catalyst solution, it reacts and causes deactivation of the catalyst. This procedure can be employed, if desired, to deactivate the catalyst after the olefin dimerization reaction has been completed.

Application of the catalyst, prepared as above described, for dimerizing ethylene, can be effected merely by contacting the catalyst solution with the olefin at any temperature in the range of −40° to 100° C. which provides a suitable rate of reaction. The reaction occurs in solution. Hence, when the starting olefin would otherwise be gaseous at the reaction temperature selected, sufficient pressure should be used to give it substantial solubility in the catalyst solution.

The dimerization reaction can be carried out batchwise or in a continuous manner. In the latter case the catalyst solution can be circulated through a contact zone such as a tank or column to which the olefin as either a gas or liquid can be continuously or intermittently fed. The reaction zone is maintained at the desired reaction temperature by cooling or heating as required. A stream of catalyst solution containing the reaction product is withdrawn from the contact zone and is introduced into a distillation zone to strip out the reaction product including dimer and any higher boiling material that may have been formed. When operating in this manner, a solvent should be selected with a sufficiently high boiling point so that the reaction product can readily be distilled therefrom, leaving as bottoms a solvent solution of the catalyst. This catalyst solution is recycled to the contact zone for reuse. If desired, the overhead product can be cohobated to separately recover the dimer fraction from the higher boiling material.

When the olefin charge is contacted in gaseous form with the catalyst solution as normally will be the case, the reaction rate will depend not only on the temperature selected, but also on the gas pressure since the pressure will determine the concentration level of the gas dissolved in the solvent for contact with the catalyst. The pressure can be regulated to achieve the rate of dimerization desired. As previously mentioned, the catalyst also tends to cause isomerization of the double bond position in the dimer product. This reaction, however, is not related to pressure when the process is conducted at a temperature below the boiling point of the dimer. Hence, by carrying out the reaction at a relatively high pressure to effect dimerization at a rapid rate and then removing the dimer from the solution soon after it has been formed, isomerization of the product can be minimized. It should be further noted, that although the rate of reaction is a function of the pressure, there is a leveling off of the yield above 300 p.s.i.

In order to specifically illustrate the invention, a series of comparative runs was made to dimerize ethylene utilizing benzene as the solvent. During the series, runs were made under varied temperature and pressure conditions; and the catalyst components and proportions thereof were varied. These variations and the results of the runs can be found in Table 1.

More specifically, the runs were carried out in the following manner. A 300 ml. stainless steel autoclave was provided with a magnetic agitator, means for introducing solids and liquids, means for cooling, temperature indicating means, and means for applying and maintaining a regulated pressure of ethylene. The reactor was purged with ethylene and 0.30 g. AlCl$_3$ was introduced. Then, in order, 20 ml. of benzene, and a mixture of 10 ml. of a 0.01 molar benzene solution of bistriphenylphosphine nickel dibromide and 5 ml. of a 0.15 molar benzene solution of triphenylphosphine were introduced rapidly at room temperature. Stirring was initiated and ethylene was admitted from a 400 p.s.i. line. There was an immediate rise in temperature, however cooling was effected and the temperature was rapidly reduced to 20° C. which was maintained throughout the reaction period. Ethylene was continuously fed into the autoclave to provide a constant 400 p.s.i.

The reaction was carried out for a period of 90 minutes whereupon the ethylene flow was stopped, the temperature was rapidly reduced to −40° C., and 10 ml. of a 10% methanol in water solution was injected to deactivate the catalyst.

The reactor was warmed gradually to room temperature while residual ethylene and the butene was allowed to distill out. The butene was collected and the residual oil in the reactor was analyzed by gas chromatography and the results, as indicated by Run No. 3, are shown in Table 1.

As will be noted from Table 1, the proportion of Lewis acid to complex in runs 1–8 was slightly greater than 20:1, while the ratio of Lewis acid to phosphine was maintained at 3:1. It should be noted that in all of these runs the butene selectivity was greater than 87%. Note further that although the yield was lowest with tributylphosphine, the highest selectivity was obtained, while when using triphenylphosphine the highest yields were obtained.

Runs 9–11 indicate the criticality of the Lewis acid to phosphine mol ratio as being between 2.5 to 3.5. The runs employed ratios of approximately 4.4, 1.5 and 6.0, respectively. As shown in Table 1, these compositions offer very low catalytic activity exemplified by the very low product yield. When the mol ratio was greater than 3.5, the product yield was at least 50% lower than with the preferred composition; and when less than a 2.5 ratio was employed, the product yield was approximately ten times lower than with the preferred range.

TABLE 1.—ETHYLENE DIMERIZATION WITH NiBr$_2$-AlCl$_3$-TPP*

| Run No. | Conditions | | | Product | | | Remarks |
|---|---|---|---|---|---|---|---|
| | P.s.i.g. | ° C. | Min. | Wt., g. | Butene, percent | Butene-1/ butene-2 | |
| 1 | 200 | 20 | 140 | 105 | 87 | .41 | |
| 2 | 300 | 20 | 90 | 134 | 88 | .43 | |
| 3 | 400 | 20 | 90 | 130 | 90 | .57 | |
| 4 | 500 | 20 | 40 | 77 | 91 | .85 | |
| 5 | 400 | 30 | 70 | 79 | 87 | .73 | Ni:Al:P=.05:2.25:.75 |
| 6 | 400 | 10 | 70 | 65 | 94 | 1.03 | (TPP)$_2$NiCl$_2$ |
| 7 | 400 | 10 | 50 | 41 | 98 | .37 | TBP |
| 8 | 400 | 10 | 60 | 43 | 88 | .88 | TCHP |
| 9 | 400 | 30 | 30 | 20 | 55 | 3.6 | Ni:Al:P=.05:3.37:.75 |
| 10 | 400 | 30 | 30 | 4 | 93 | .32 | Ni:Al:P=.05:1.12:.75 |
| 11 | 400 | 30 | 40 | 27 | 74 | 1.3 | Ni:Al:P=.05:2.25:.37 |

*Catalyst 2.25×10$^{-3}$ mole AlCl$_3$, 10$^{-4}$ mole NiBr$_2$.2TPP, 7.5×10$^{-4}$ TPP unless otherwise noted.

NOTE: TPP=Triphenylphosphine; TBP=Tributylphosphine; TCHP=Tricyclohexylphosphine.

I claim:
1. A process for dimerizing ethylene to a mixture of butenes containing a ratio of butene-1 to butene-2 ranging from about 0.3 to about 1.0 which comprises contacting ethylene at a temperature between about −40° C. and about 100° C. with an aromatic hydrocarbon solu- tion of a catalyst which is a combination of a coordination complex having any of the formulas,

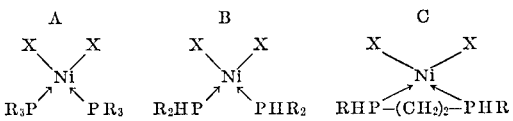

aluminum chloride, and in excess of that required to form said coordination complex, a phosphine selected from the group consisting of $PR_3$, $PHR_2$, and $$PHR—(CH_2)_2—PHR$$

X is chlorine, bromine, or iodine, and R represents hydrocarbon radicals having 1–30 carbon atoms selected from the group consisting of alkyl, cycloalkyl, alkenyl, cycloalkenyl, aryl, aralkyl, and aralkenyl; the atomic ratio of Al to Ni in the system being in excess of 2:1 and the molar ratio of aluminum chloride to said excess phosphine being in the range of 2.5:1 to 3.5:1.

2. A process in accordance with claim 1 wherein said temperature is in the range of −10° to 50° C.

3. A process in accordance with claim 2 wherein said coordination complex has Formula A.

4. A process in accordance with claim 2 wherein X is chlorine or bromine.

5. A process in accordance with claim 2 wherein the molar ratio of aluminum chloride to phosphine is 3.

References Cited

UNITED STATES PATENTS

| | | | |
|---|---|---|---|
| 3,228,917 | 1/1966 | Childers | 260—94.3 |
| 3,382,292 | 5/1968 | Endler et al. | 260—683.15 |

FOREIGN PATENTS

| | | | |
|---|---|---|---|
| 62,561 | 7/1968 | Germany | 260—683.15 |
| 6,809,282 | 1/1969 | Netherlands | 260—683.15 |

PAUL M. COUGHLAN, JR., Primary Examiner

U.S. Cl. X.R.

252—429